Patented Apr. 22, 1930

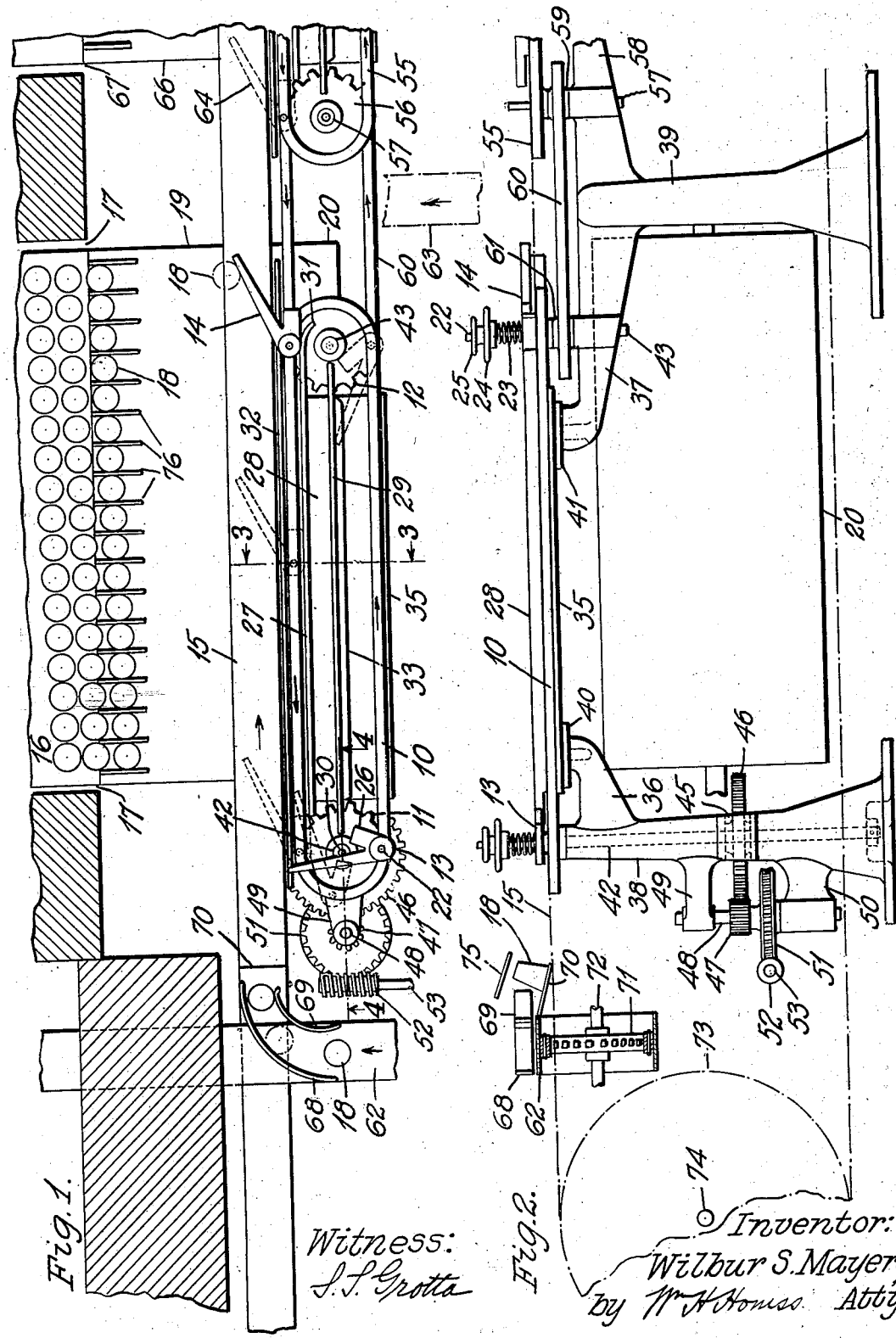

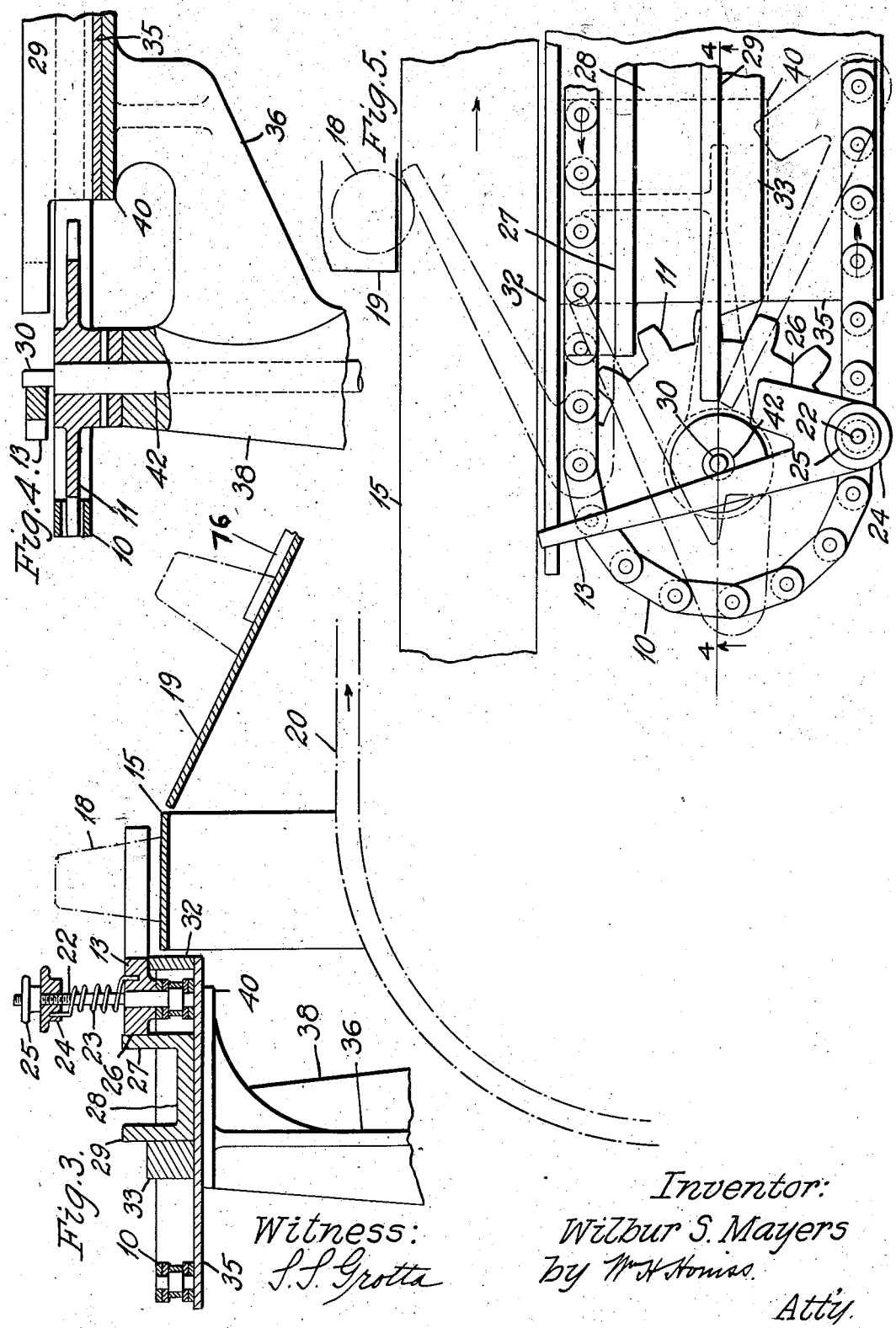

1,755,404

UNITED STATES PATENT OFFICE

WILBUR S. MAYERS, OF FAIRMONT, WEST VIRGINIA, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR HANDLING GLASSWARE

Application filed December 30, 1922. Serial No. 609,860.

This invention relates to methods of and apparatus for handling glassware and has for its principal object to provide improved mechanism adapted successively to transfer the articles in orderly arrangement from a carrier to some other carrier or support, as for example to the belt or apron of an annealing leer. Other objects of the invention will appear hereinafter.

The apparatus preferably embodies oppositely moving devices, one of which is adapted successively to advance articles of ware along a predetermined path, and the other adapted to move in coincidence therewith and adapted to move the articles successively aside from said path, the relative positions of the devices and their speeds being regulated to produce the desired results in discharging the articles from the carrier.

Suitable constructions and arrangements for illustrating the invention are shown in the drawings, in which:—

Figure 1 is a diagrammatic plan of one embodiment of the invention;

Fig. 2 is a side elevation of the machine shown in Fig. 1;

Fig. 3 is a sectional elevation on an enlarged scale, taken on line 3—3 of Fig. 1;

Fig. 4 is a sectional elevation taken on line 4—4 of Figs. 1 and 5; and

Fig. 5 is a plan of the apparatus shown in Fig. 4.

The present invention embodies an endless stacker belt 10, preferably a chain, carried by sprockets 11 and 12, and traveling in a loop-like path across the entrance 16 of a leer 17, alongside of a cross carrier or conveyor 15, also moving across that entrance, and bringing in a succession of the articles 18 to be "stacked" into the leer. The belt or chain 10 is provided with one or more deflector fingers or wipers 13 and 14 (Fig. 1), which, when traveling in a direction opposite to that of the carrier, projects over and moves in coincidence with the carrier, and as it thus meets the successive articles, wipes them off from the carrier, preferably onto an inclined apron 19 serving to discharge the articles by gravity to the leer conveyor 20, which is arranged to move through the leer at the desired speed.

Completing its travel across the leer entrance, the finger is withdrawn from the pathway of the on-coming articles, and is carried back on the other side of its looped path, to the other side of the leer entrance, where it is again projected across and over the path of the carrier, and repeats its wiping off function on the advancing row of articles on the carrier. The speed of the carrier 15 relative to the speed of the stacker belt 10 is preferably such that the first of the articles remaining on the carrier after the withdrawal of the finger will be carried across the leer entrance in time to meet a deflector finger at the other side of the entrance. When more than one finger is used the relative speed should be adjusted accordingly.

In the arrangement shown in the drawings the deflecting devices are arranged so as to fill the entire width of the leer with ware. They may, however, be so placed or adjusted and timed so as to deflect shorter rows of the ware from the carrier, and place these rows at any desired portion of the width of the leer.

The leer conveyor 20 is preferably operated continuously and may be timed so that it will advance about the diameter of one article of ware in the time required to deposit one row of articles thereon. The speed of the conveyor 20 may be varied and controlled by any well known operating mechanism.

The deflectors 13 and 14 are pivoted or hinged upon any suitable attachments carried by the stacker belt 10, such for example as the studs 22 (Fig. 3) which may be secured upon the belt in any desired manner, either in the middle of the link or upon one of the link pins, as shown. Springs 23 for controlling said deflectors have their lower ends suitably connected with the deflectors and their upper ends connected with the hand wheels 24, which are threaded upon the studs 22 and held by the lock nuts 25. The springs are adapted to move the deflectors clockwise at the conclusion of their active strokes to provide a quick withdrawal from the path of movement of the oncoming ware and are given the desired tension by turning the hand wheels 24. The deflectors are provided with angularly disposed arms or lugs 26, which travel upon a guide 27 when moving over the carrier 15, whereby the deflectors are held obliquely to the carrier when pushing the ware therefrom. Other deflectors with the arms 26 disposed at the desired angle may be substituted for those shown, depending on the inclination best suited for the different sizes of ware to be handled. The guide 27 preferably forms one leg of a channel 28 having its opposite leg 29 in position to engage the outer ends of the deflectors, which are yieldingly held in engagement with said leg by the springs 23 when the deflectors are returning to ware engaging position.

When each deflector finger reaches the end of its effective movement, its spring 23 causes the deflector to be quickly withdrawn from the path of the oncoming ware, which takes place at the time the arm 26 of the deflector clears the left-hand end of the guide 27, at which time the deflector is brought into engagement with the guide 27 and rides thereon until the deflector has traveled a little more than a fourth of the distance around the sprocket. The deflector then moves into engagement with a stop pin 30 at the center of the sprocket 11 and pivots upon this pin as it continues to travel around the sprocket and when clearing the pin it is forced by the spring into engagement with the outer leg 29 of the channel 28. If desired, the stop pin 30 may be omitted and the guide 29 extended to form a stop and pivot for turning the deflector backwardly. The several positions of the deflector in its movement about the sprocket 11 are indicated by the full and dotted line positions in Fig. 5. When the deflector reaches the right-hand end of the belt, its arm 26 will move into engagement with and pivot upon the inwardly curved portion 31 of the guide 27, and by reason of such pivotal movement the deflector will be rotated upon the stud 22 and swung into ware engaging position over the carrier, as indicated by the full line position at the right of Fig. 1. Continued advancement of the deflector in a direction opposite to the movement of the ware as indicated by the two dotted line positions over the carrier in Fig. 1 will successively force the articles from the carrier until the entire row has been pushed onto the ware discharging apron 19, or onto other means for receiving the ware.

The deflectors may be timed to meet the first of a series of articles advancing on the carrier at any desired point thereon, and may also be withdrawn from the carrier at whatever point desired, by varying the length of the guide 27, which may be made detachable to permit shorter guides of the required lengths to be used, thus permitting withdrawal of the deflectors at any point at which it may be desired to end the rows of ware discharged to the leer.

A supporting bar 32 is provided for sustaining the weight of the deflectors when traveling over the carrier, and likewise, a similar bar 33 is provided for supporting the ends of the deflectors when returning to engaging position. The bars 32 and 33 and the deflector guide channel 28 are all carried by a support 35 which also forms means for supporting the stacker belt chain between the sprockets 11 and 12. The belt supporting member 35 extends between the arms 36 and 37 of the standards 38 and 39 respectively, and is suitably connected with the horizontally disposed plate portions 40 and 41 of said arms as shown in Fig. 2.

The stacker belt sprocket 11 is suitably connected with and driven by a shaft 42, vertically disposed in the standard 38 and suitably held therein for rotation. The sprocket 12 at the opposite end of the belt is loosely mounted upon a spindle 43 carried by the arm 37 of the standard 39 (Fig. 2). Secured upon the shaft 42, in a recessed portion 45 of the standard 38 is a gear 46, meshing with a pinion 47 on a shaft 48, journaled in the arms 49 and 50 of the standard 38. The shaft 48 is provided with a worm wheel 51 meshing with a worm 52 on a shaft 53, suitably supported and driven by any desired power means, regulated to drive the stacker belt at the desired speed.

In order that the successive points of discharge of the articles from the carrier may be varied if desired, the pinion 47 is slidably keyed upon the shaft 48 so that it may be raised out of mesh with the gear 46 to permit the gear to be advanced or retarded one or more teeth, according to the amount of adjustment desired for the deflectors.

One or more stackers of the type described above may be used for feeding the ware to a plurality of leers and, if desired, the additional stackers may be connected with and driven by the first stacker in the series, as shown in Figs. 1 and 2. The added stacker belt 55, and the parts cooperating therewith to deliver the ware from the carrier 15 to an additional leer 67 is similar to the stacker already described. The belt 55 engages a sprocket 56 loose on a spindle 57 carried by the arm 58 of the standard 39. Beneath the sprocket 56 and suitably connected therewith is a sprocket 59, also loose on the spindle 57, and driven by a chain 60 egaging a sprocket 61 on the spindle 43, said sprocket 61 being suitably connected with and driven by the sprocket 12, which in turn is driven by the stacker belt 10.

When two or more stackers are employed, each with a full number of deflectors adapted to discharge ware from a cross carrier operating continuously adjacent to the several leers, the articles may be delivered to the carrier by separate carrying-in conveyors 62 and 63 (Fig. 1), discharging the ware onto the carrier at the left-hand ends of the respective stacker belts. For example, the deflectors 64 on the stacker belt 55 will discharge the ware onto an inclined apron 66 extending into the leer 67, at the same time that the deflectors of the stacker belt 10 are discharging ware onto the apron 19, extending into the left-hand leer 17.

The two stackers described herein may be used in connection with a single leer, to which it may be desirable to deliver ware received from different ware shaping machines at the same time, using any suitable transfer mechanism for conveying the ware from the shaping machines to cross carrier 15.

Any suitable type of transfer mechanism may be employed for delivering the ware from one or more shaping machines to the cross carrier 15, but when conveyor belts, as indicated at 62 and 63, are employed, the top runs of said belts may be extended over the top run of the carrier belt 15. In each of these cases, guide plates 68 and 69 cause the ware to be delivered onto an inclined apron 70, serving to discharge the ware by gravity onto the carrier 15.

The carrying-in conveyor 62 may be driven by a sprocket 71 on a drive shaft 72, connected with any suitable driving means, the speed of which may be regulated as desired.

The drive shaft 74 for the pulley or sprocket 73, which drives the carrier 15, may be driven at the desired speed by the same power means for driving the worm shaft 53 and the worm 52, serving to drive the stacker belt 10, the relative speeds of the stacker or stackers and the carrier 15 being regulated as desired, according to the number of articles to be delivered to the leer or leers in a given time. In fact, the speeds of all of the ware carrying devices, including the leer conveyor 20, will be regulated by suitable adjustments of the actuating mechanism or mechanisms therefor, depending upon the requirements to be fulfilled in the operations of the machines from time to time.

Where it is desired to deliver the ware to the cross carrier 15 by a single carrying-in conveyor, as the conveyor 62, and also to discharge said ware into both leers 17 and 67, one of the deflectors of each stacker belt may be removed and the remaining deflectors so positioned upon their belts as to alternately begin pushing the ware from the carrier 15, at the right-hand sides of the two leers, to effect the proper and equal distribution of the articles to said leers, the deflector 64 being so positioned and timed as to discharge onto the apron 66 all of the articles remaining on the carrier between the two deflectors when the deflector 14 moves into the full line position shown at the right of Fig. 1.

The carrier 15 may be placed close to the entrance of the leer or leers, so that the ware may be deposited directly into the leers by the deflectors, using the inclined apron 19, if desired, or discharging the ware from the carrier directly onto the leer conveyor 20, with such changes in the relative positions and proportions of the leer conveyor and carrier as may be required.

In the feeding of glassware from the conveyor 62 to the carrier 15, a guard plate 75 (Fig. 2) may be positioned over the inclined apron 70 to prevent overturning of the articles when sliding upon the apron toward the carrier. The plate will be supported by any suitable means and made adjustable vertically for use with articles of different heights, and may be removed in cases where the ware is of a character not requiring its use.

The inclined aprons 19 and 66 may be provided with suitable guide strips 76 for the ware, spaced equal distances apart, with sufficient clearance to permit the articles to pass freely between them when discharging onto the leer conveyors, whereby the articles may be accurately aligned in longitudinal rows upon said conveyors. The strips may either be made adjustable laterally upon the apron to accommodate articles of different sizes, or separate aprons may be provided carrying strips properly spaced to suit the different sizes of ware to be fed to the leers. The strips may be omitted if desired, as the articles can be successfully delivered to the leer without their use.

If desired, the direction of movement of the cross carrier and stacker belts, together with their operating mechanisms, may be reversed, the deflectors and their supporting and guiding members being properly positioned to accomplish the desired results.

In view of the many possible variations in carrying out my invention, it will be understood that no limitations are to be imposed thereon except such as are indicated in the appended claims.

I claim:

1. In glassware handling apparatus, the combination with a movable carrier for the ware of a member movable in a closed substantially horizontal path adjacent to said carrier, the movement of said member being differential to that of said carrier, a deflector mounted on said member, and means for moving said deflector on said member into and out of the path of movement of the ware on said carrier.

2. In glassware handling apparatus, the combination with a continuously moving carrier for the ware of a member movable in a closed path adjacent to said carrier, the movement of said member being differential to that of said carrier, a deflector pivotally mounted on said member, and means for swinging said deflector about a center on said member to project said deflector into and out of the path of movement of the ware on said carrier.

3. In glassware handling apparatus, the combination with a carrier for the ware of a member movable in a closed path adjacent to said carrier, a deflector pivotally mounted on said member, a cam for swinging said deflector on said member to project it into the path of movement of the ware on the carrier, and a spring for withdrawing said deflector from operative position.

4. In glassware handling apparatus, the combination with a carrier for the ware of a member movable in a closed path adjacent to said carrier, an arm mounted on said member, means for projecting said arm into the path of movement of the ware on said carrier, means for actuating said member in a direction opposite to that of the movement of the carrier to cause said arm to displace a series of articles from said carrier, and means for swinging said arm in the direction of movement of the ware on said carrier out of the path of movement thereof at the conclusion of its active stroke.

5. In glassware handling apparatus, the combination with a carrier for the ware of a member movable in a closed path adjacent to and in a direction opposite to that of said carrier, a deflector pivotally mounted on said member, a spring adapted to swing said deflector out of the path of movement of the ware on said carrier at the conclusion of its active stroke and a bar for swinging said deflector against the action of said spring into the path of movement of the ware at the beginning of its active stroke and maintaining it in such position throughout its travel over said carrier.

6. In glassware handling apparatus, the combination with a carrier for the ware of a member movable in a closed path adjacent to said carrier and having a differential motion with respect thereto, a deflector pivotally mounted on said member, and means for moving said deflector into and out of the path of movement of the ware on said carrier, said means including a cam removable to permit its replacement by a cam of different size, whereby the length of the operative stroke of said deflector may be varied.

7. In glassware handling apparatus, the combination with a carrier for the ware of a member movable in a closed path adjacent to said carrier and having a differential motion with respect thereto, a deflector pivotally mounted on said member, means for gradually moving said deflector into operative position, and means for abruptly withdrawing it from operative position at the end of a predetermined length of stroke.

Signed at Fairmont, W. Va., this 27th day of December, 1922.

WILBUR S. MAYERS.